United States Patent
Liu et al.

(10) Patent No.: US 10,279,451 B1
(45) Date of Patent: May 7, 2019

(54) DUAL PERPENDICULAR MAGNETIC RECORDING (PMR) WRITER APPLICATION WITH SPECIAL UP AND DOWN HEAD ASSIGNMENT FOR BEST AREAL DENSITY IN HARD DISK DRIVE (HDD)

(71) Applicant: Headway Technologies, Inc., Milpitas, CA (US)

(72) Inventors: Yue Liu, Fremont, CA (US); Yuhui Tang, Milpitas, CA (US); Moris M. Dovek, San Jose, CA (US); Kowang Liu, Fremont, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 15/942,756

(22) Filed: Apr. 2, 2018

(51) Int. Cl.
| | |
|---|---|
| *G11B 5/00* | (2006.01) |
| *B24B 37/04* | (2012.01) |
| *G11B 5/596* | (2006.01) |
| *B24B 37/013* | (2012.01) |
| *G11B 5/012* | (2006.01) |
| *G11B 5/31* | (2006.01) |
| *G11B 5/09* | (2006.01) |

(52) U.S. Cl.
CPC .......... *B24B 37/048* (2013.01); *B24B 37/013* (2013.01); *G11B 5/012* (2013.01); *G11B 5/09* (2013.01); *G11B 5/315* (2013.01); *G11B 5/59638* (2013.01)

(58) Field of Classification Search
CPC ..... B25B 37/048; B25B 37/013; G11B 5/012; G11B 5/00; G11B 5/09; G11B 5/315; G11B 5/59638

USPC ............................. 360/125.01–125.05
See application file for complete search history.

(56) References Cited

U.S. PATENT DOCUMENTS

| | | |
|---|---|---|
| 6,665,136 B2 | 12/2003 | Clinton et al. |
| 7,907,360 B2 | 3/2011 | Mak et al. |
| 8,218,264 B1 | 7/2012 | Sasaki et al. |
| 8,274,758 B2 | 9/2012 | Wu et al. |

(Continued)

OTHER PUBLICATIONS

Co-pending U.S. Appl. No. 15/912,821, filed Mar. 6, 2018, by Yuhui Tang et al., "Designs for Multiple Perpendicular Magnetic Recording (PMR) Writers and Related Head Gimbal Assembly (HGA) Process," 49 pgs.

(Continued)

*Primary Examiner* — Allen T Cao
(74) *Attorney, Agent, or Firm* — Saile Ackerman LLC; Stephen B. Ackerman

(57) ABSTRACT

A dual PMR writer is disclosed wherein the better writer at outer diameter (OD) skew is paired with a suspension after dynamic performance (DP) spin stand testing so that the better writer is the inner writer formed closer to a recording disk center than the other writer. Accordingly, lower read write offset is achieved at OD skew and better area density capability is realized. Preferably, there is a symmetrical or substantially symmetrical air bearing surface design after lapping and spin stand testing to afford flexibility in pairing an up facing (UP) head configuration with an UP suspension, or a down facing (DN) head configuration with a DN suspension to enable the better writer to be the inner writer. The dual PMR writer may have a dual dynamic fly height heater on each side of a center plane separating the two writers to improve write gap protrusion in the better writer.

23 Claims, 10 Drawing Sheets

(56) References Cited

U.S. PATENT DOCUMENTS

| | | |
|---|---|---|
| 8,810,764 B2 | 8/2014 | Nishida et al. |
| 8,828,248 B2 | 9/2014 | Mao et al. |
| 8,836,059 B2 | 9/2014 | Ahn et al. |
| 9,171,561 B1 | 10/2015 | Gadbois et al. |
| 9,361,912 B1 * | 6/2016 | Liu ............ G11B 5/187 |
| 9,387,568 B1 | 7/2016 | Ilaw et al. |
| 9,508,364 B1 * | 11/2016 | Tang ............ G11B 5/112 |
| 9,613,642 B1 | 4/2017 | Erden et al. |
| 9,754,612 B2 | 9/2017 | Wei et al. |
| 9,805,744 B1 | 10/2017 | Xue et al. |
| 10,014,021 B1 * | 7/2018 | Liu ............ G11B 5/1278 |
| 2006/0145721 A1 | 7/2006 | Ton-Churo |
| 2010/0007986 A1 | 1/2010 | Mak et al. |
| 2016/0254014 A1 | 9/2016 | Biskeborn et al. |
| 2017/0148473 A1 * | 5/2017 | Wei ............ G11B 5/315 |
| 2017/0256275 A1 | 9/2017 | Hutchinson et al. |
| 2018/0330748 A1 * | 11/2018 | Liu ............ G11B 5/112 |

OTHER PUBLICATIONS

Co-pending U.S. Appl. No. 15/874,986, filed Jan. 9, 2018, by Kowang Liu et al., "Magnetic Core and Coil Design for Double Perpendicular Magnetic Recording (PMR) Writers," 46 pgs.

Co-pending U.S. Appl. No. 15/913,167, filed Mar. 6, 2018, by Yue Liu, "Dual Perpendicular Magnetic Recording (PMR) Writer Base Structures and Mirror Imaged Asymmetrical Magnetic Core Shapes for Reduced Writer-Writer Spacing (WWS)," 52 pgs.

Co-pending U.S. Appl. No. 15/942,640, filed Apr. 2, 2018, by Kowang Liu et al., "Magnetic Core and Coil Design for Double Perpendicular Magnetic Recording (PMR) Writers," 50 pgs.

* cited by examiner

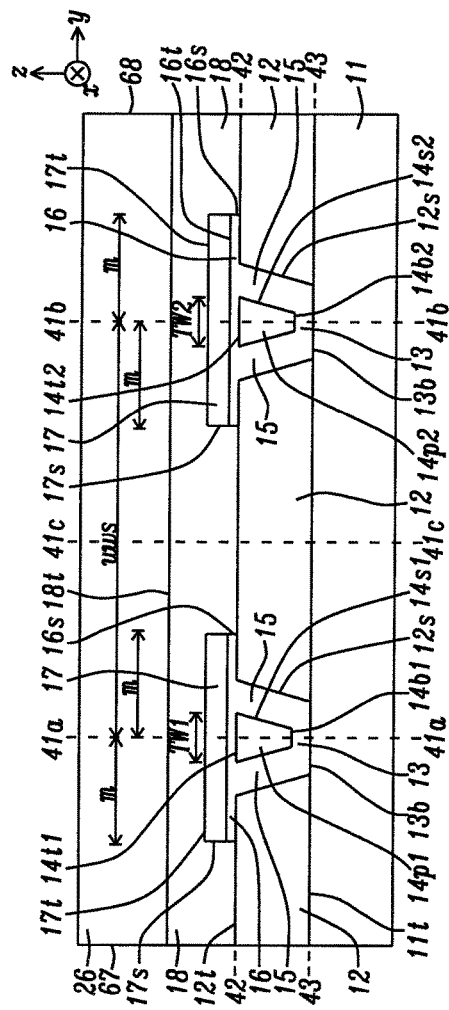
FIG. 1
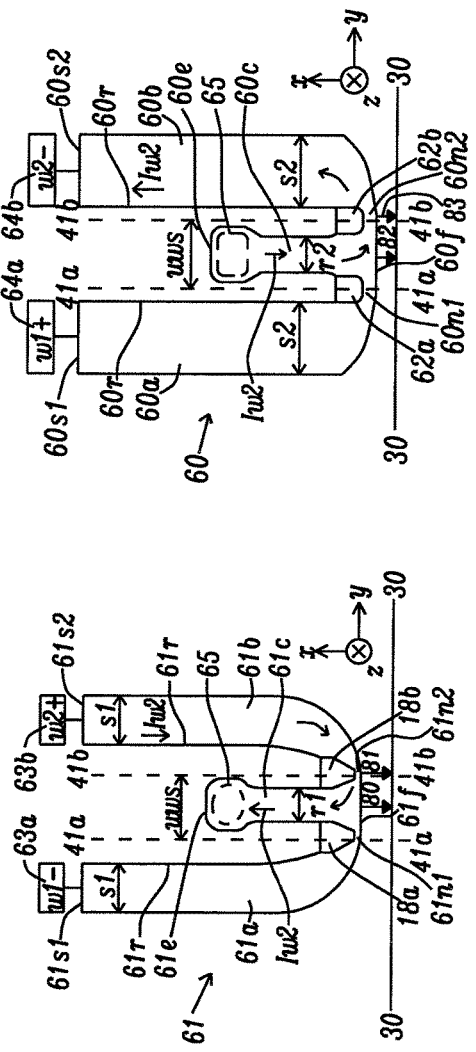
FIG. 2A
FIG. 2B

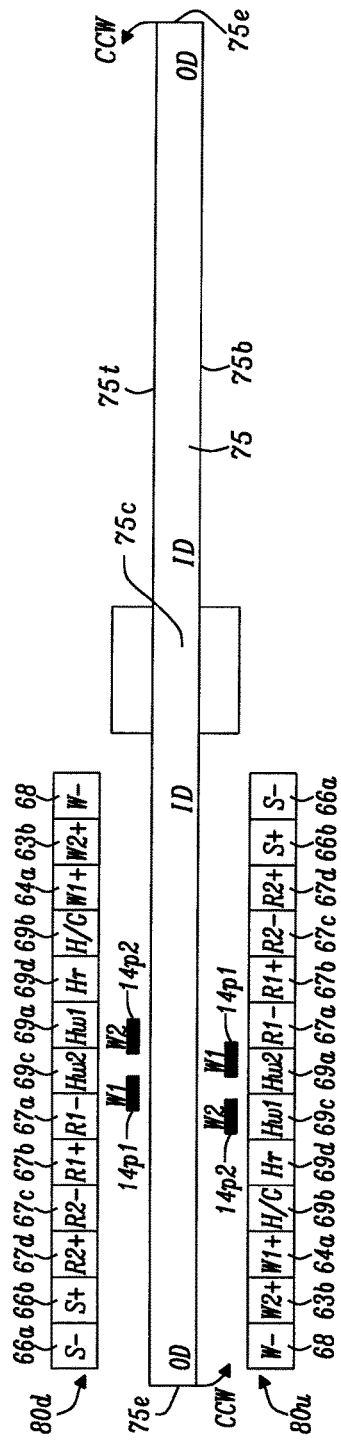
FIG. 7
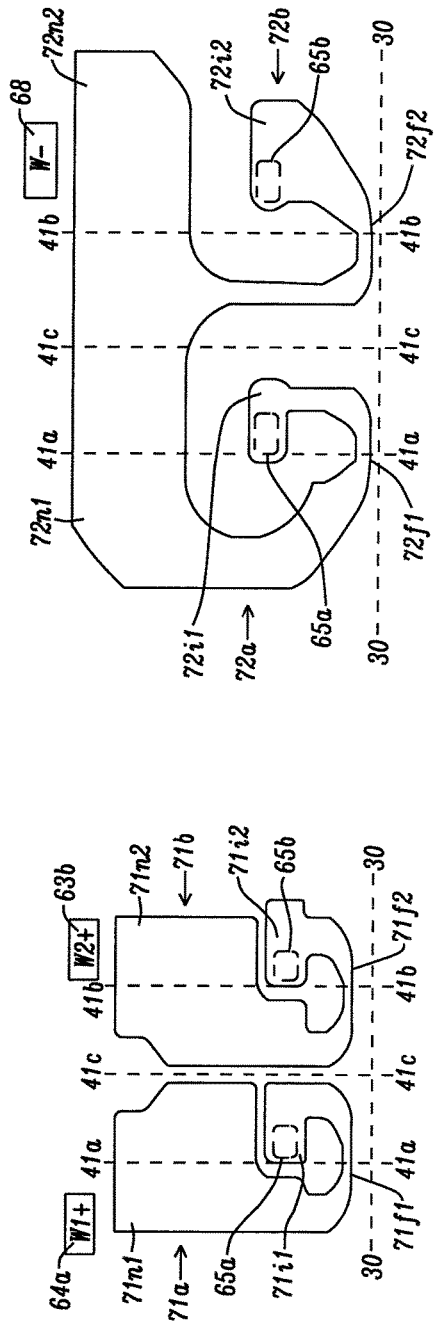
FIG. 8
FIG. 9

US 10,279,451 B1

DUAL PERPENDICULAR MAGNETIC RECORDING (PMR) WRITER APPLICATION WITH SPECIAL UP AND DOWN HEAD ASSIGNMENT FOR BEST AREAL DENSITY IN HARD DISK DRIVE (HDD)

RELATED PATENT APPLICATIONS

This application is related to the following: Ser. No. 15/912,821, filing date Mar. 6, 2018; Ser. No. 15/942,640, filing date Apr. 2, 2018; Ser. No. 15/874,986, Ser. No. 1/19/18; and Ser. No. 15/913,167, filing date Mar. 6, 2018; which are assigned to a common assignee and herein incorporated by reference in their entirety.

TECHNICAL FIELD

The present disclosure relates to a PMR write head that is configured to have two writers per slider and a symmetrical or semi-symmetrical air bearing surface (ABS) design. After the writer with better performance at an outer diameter (OD) skew is determined during spin stand testing at slider level, the slider is assigned either an up facing (UP) head configuration paired with an UP suspension or a down facing (DN) head configuration paired with a DN suspension, thereby ensuring the better writer is a smaller distance from the center of a recording disk during a write process and enabling a reduction in read write offset (RWO) at OD skew and enhanced area density capability (ADC) when integrated in a head gimbal assembly (HGA).

BACKGROUND

Perpendicular magnetic recording has been developed in part to achieve higher recording density than is realized with longitudinal recording devices. A PMR write head typically has a main pole layer with a small surface area (pole tip) at an ABS, and coils that conduct a current and generate a magnetic flux in the main pole such that the magnetic flux exits through the pole tip and enters a magnetic recording medium (disk) adjacent to the ABS. Magnetic flux is used to write a selected number of bits in the magnetic recording medium and typically returns to the main pole through two pathways including a trailing loop and a leading loop. The trailing loop has a trailing shield structure with first and second trailing shield sides at the ABS. An uppermost (PP3) trailing shield arches over the driving coil and connects to a top yoke that adjoins a top surface of the main pole layer near a back gap connection. The leading loop has a leading shield with a side at the ABS and that is connected to a return path (RTP) proximate to the ABS. The RTP extends to the back gap connection (BGC) and enables magnetic flux in the leading loop pathway to return from the leading shield at the ABS and through the BGC to the main pole layer. Magnetic flux is able to flow through the leading loop and trailing loop.

The double write shield (DWS) design that features the leading and trailing loops was invented for adjacent track erasure (ATE) improvement by reducing stray field in side shields and in the leading shield. Accordingly, a PMR head has a great advantage over LMR in providing higher write field, better read back signal, and potentially much higher areal density. With the growing demand for cloud storage and cloud-based network computing, high and ultra high data rate recording becomes important for high-end disk drive applications.

To achieve areal density in a HDD beyond 2 terabytes per platter (TBPP) for conventional PMR, dual writer designs have been proposed where the better of the two writers is determined during back end testing, and then the better writer is integrated in a HGA. One problem with this strategy is that the better writer is not selected before spin stand dynamic performance (DP) testing is completed. In other words, the ABS pattern needs to be applied before the spin stand DP data is generated. This process implies a head is predetermined to be up facing (UP) or down facing (DN) before DP testing, and during slider fabrication when the ABS pattern is completed. Currently, the ABS pattern is the same for UP and DN heads except one is the mirror image of the other. Thus, an UP head will pair with UP suspension and a DN head will pair with DN suspension at slider fabrication. Unfortunately, during a write process with OD skew, RWO will increase and ADC will degrade if the better writer has an unoptimized head orientation. Therefore, an improved dual PMR writer scheme is needed to ensure that the selected (better) writer has a head correctly configured UP or DN after the slider is formed on the suspension to provide a minimum RWO and maximum ADC at OD skew.

SUMMARY

One objective of the present disclosure is to provide a dual PMR writer design that enables improved flexibility in assigning an UP or DN head position to the better writer at OD skew after the ABS is formed and spin stand DP testing is completed.

Another objective of the present disclosure is to provide a dynamic fly height (DFH) heater scheme that is compatible with a dual PMR writer design of the first objective such that write gap protrusion for the better writer is optimized.

These objectives are achieved by configuring a dual PMR writer (two writers per slider) where the better of the two writers at OD skew is determined during backend slider/HGA level performance testing, and is subsequently integrated into a HGA and Head-Stack Assembly (HAS) for state of the art HDDs by pairing with an appropriate UP or DN suspension so that the better writer is always the "inner" writer during a write process. According to one embodiment, each of the writers features a main pole in which flux is generated by flowing a current through a bucking coil and driving coil wherein a center bucking coil portion and a center driving coil portion contact an interconnect to enable opposite polarity in the magnetic flux direction. In another embodiment, each writer has a separate bucking coil and separate driving coil. There is a cross-track distance at the ABS known as writer-writer spacing (WWS) between the centers of the two main poles that is preferably ≤15 microns such that the read-write offset (RWO) in the cross-track direction is minimized when there is a single reader or double reader formed a down-track distance below the main poles and at a center plane that separates the two writers.

The dynamic performance of each writer is determined by spin stand testing after an ABS is formed. The writers are tested at a θ skew angle such as −15 degrees typical of OD writing.

At 0 degree skew where the reader or dual reader is at the center plane at the ABS, RWO or "c" is −a/2 for writer 1, and RWO or "d" is a/2 for writer 2 where "a" is effectively WWS. However, at OD skew θ, RWO for writer 1 is $c = \cos(\theta) \times [a/2 + b \times \tan(\theta)]$ and RWO for writer 2 is $d = \cos(\theta) \times [a/2 - b \times \tan(\theta)]$ where "b" is the down-track distance at the ABS along the center plane between a plane including both trailing sides of the two main poles and a top surface of the reader (or dual reader). In other words, absolute value of c at OD skew θ is desirably less than the absolute value of "−a/2" at 0° skew, but d at OD skew θ>"a/2" at 0° skew. In HDD applications, smaller RWO is always preferred for less track misregistration and better ADC. Smaller "b" at the same "a" will enlarge "c" and reduce "d" while smaller "a" at the same "b" will shrink both "c" and "d" when both heads are UP facing. When both heads are down facing, RWO for writer 2 is "c" and RWO for writer 1 is "d".

The overall process for integrating the dual PMR writer in a HGA comprises (1) lapping the dual PMR writer structure to form a symmetrical or substantially symmetrical ABS design, (2) performing spin stand DP testing to determine the better writer at OD skew, (3) assigning an UP or DN head configuration depending on whether writer 1 or 2 has better performance results, and (4) pairing the UP head configuration with an UP suspension, or DN head configuration with a DN suspension in the HGA. Thus, the writer with better performance at OD skew will be the inner writer and a smaller distance from the recording disk center than the outer writer. The outer writer that has poorer performance is disabled.

In some embodiments, the dual PMR writer comprises a single W_DFH heater that is symmetrically disposed with respect to the center plane. In an alternative embodiment, a dual W_DFH heater scheme is provided such that one W_DFH heater is paired with writer 1 on one side of the center plane, and a second W_DFH heater is paired with writer 2 on the other side of the center plane to optimize write gap (WG) protrusion in the better writer. Thus, only the first W_DFH heater is activated when writer 1 is used for a write process, or only the second W_DFH heater is employed when writer 2 is used for writing.

BRIEF DESCRIPTION OF THE DRAWINGS

FIG. 1 is an ABS view of a dual PMR writer scheme wherein two main poles have a cross-track writer-writer spacing (WWS), and share a trailing shield and leading shield at the ABS according to an embodiment of the present disclosure.

FIG. 2A shows a top-down view of a driving coil design in a dual PMR writer scheme where each writer is energized with a different write current through a separate driving coil pathway connected to a center interconnect according to an embodiment of the present disclosure.

FIG. 2B shows a top-down view of a bucking coil design in a dual PMR writer scheme where each writer is energized with a different write current through a separate bucking coil pathway connected to a center interconnect according to an embodiment of the present disclosure.

FIG. 7 is a schematic drawing of a down facing (DN) head paired with a down facing (DN) suspension above a recording disk, and an up facing (UP) head paired with an UP suspension below the recording disk.

FIG. 8 is a top-down view of another embodiment of a bucking coil design in a dual PMR writer of the present disclosure where each writer has a separate bucking coil and a separate interconnect to a driving coil.

FIG. 9 is a top-down view of another embodiment of a driving coil design in a dual PMR writer of the present disclosure where each writer has a separate driving coil but the driving coils are joined at a backside and connected to a common W− pad.

DETAILED DESCRIPTION

Figure 3A:
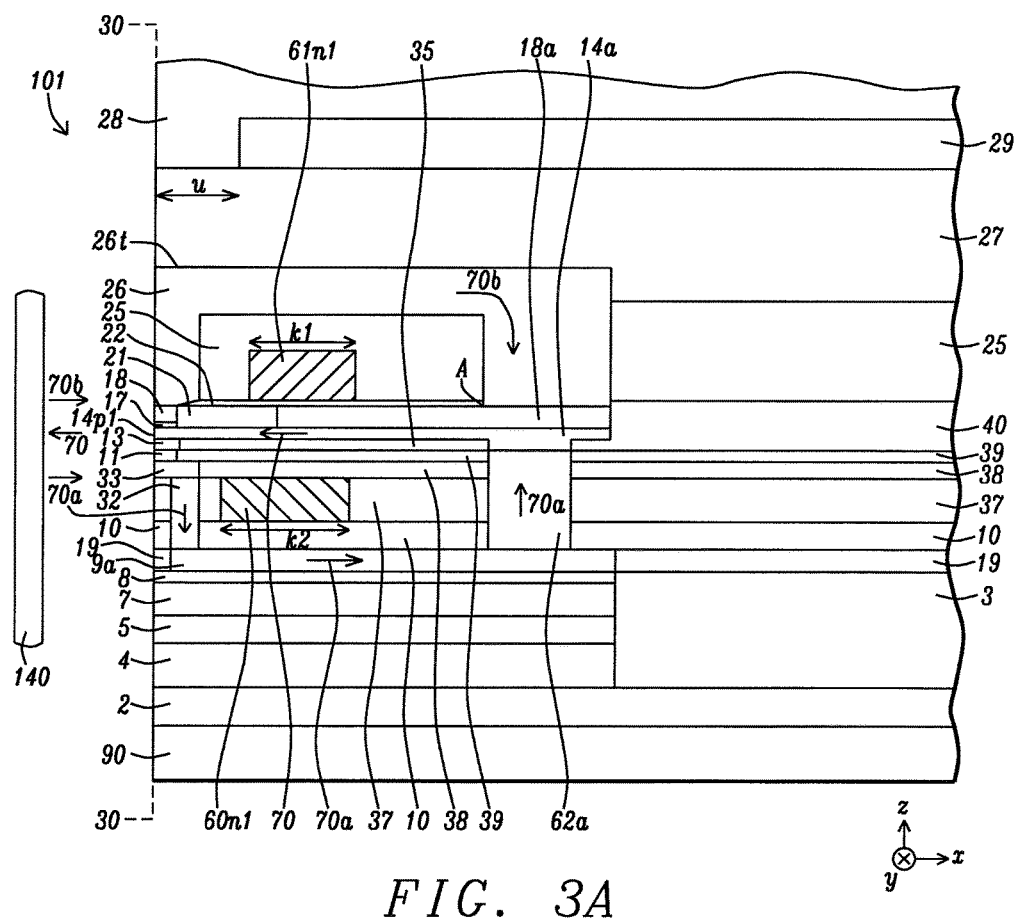
FIGS. 3A-3B are down-track cross-sectional views of the first and second writers, respectively, in FIGS. 2A, 2B along a plane that bisects the first main pole layer (FIG. 3A), and along a plane bisecting the second main pole layer (FIG. 3B).

The present disclosure relates to a dual PMR writer scheme having a symmetrical or semi-symmetrical ABS design that enables assigning an UP head configuration or a DN head configuration after lapping to form an ABS, and after backend DP testing that determines which writer has better performance. The flexibility in assigning head orientation after lapping but before pairing with a suspension in the HGA enables smaller RWO, especially for OD skew writing. In the drawings, the y-axis is a cross-track direction, the z-axis is a down-track direction, and the x-axis is in a direction orthogonal to the ABS and towards a back end of the device. Dimensions of writer components are expressed as a width in the y-axis direction, height in the x-axis direction, and thickness in the z-axis direction.

Figure 13:
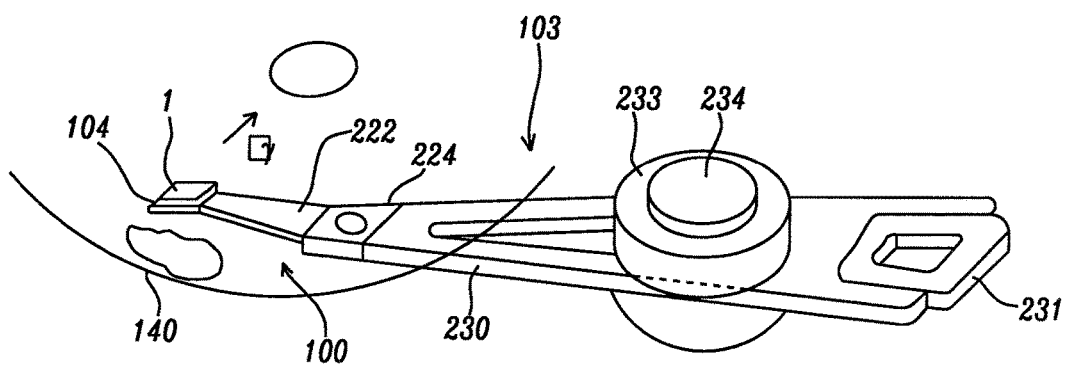
FIG. 13 is a perspective view of a head arm assembly of the present disclosure.

Referring to FIG. 13, a HGA 100 includes a magnetic recording head 1 comprised of a slider and a PMR writer structure formed thereon, and a suspension 103 that elastically supports the magnetic recording head. The suspension has a plate spring-like load beam 222 formed with stainless steel, a flexure 104 provided at one end portion of the load beam, and a base plate 224 provided at the other end portion of the load beam. The slider portion of the magnetic recording head is joined to the flexure, which gives an appropriate degree of freedom to the magnetic recording head. A gimbal part (not shown) for maintaining a posture of the magnetic recording head at a steady level is provided in a portion of the flexure to which the slider is mounted.

HGA 100 is mounted on an arm 230 formed in the head arm assembly 103. The arm moves the magnetic recording head 1 in the cross-track direction y of the magnetic recording medium 140. One end of the arm is mounted on base plate 224. A coil 231 that is a portion of a voice coil motor is mounted on the other end of the arm. A bearing part 233 is provided in the intermediate portion of arm 230. The arm is rotatably supported using a shaft 234 mounted to the bearing part 233. The arm 230 and the voice coil motor that drives the arm configure an actuator.

Figure 14:
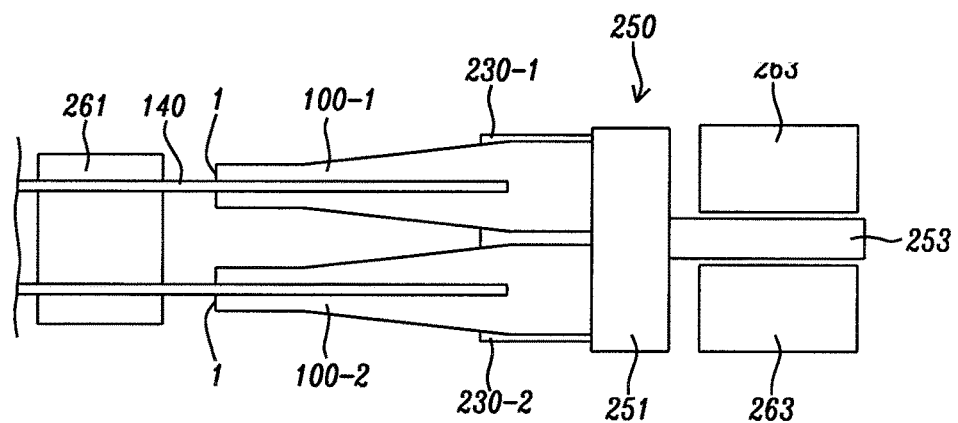
FIG. 14 is side view of a head stack assembly of the present disclosure.

Next, a side view of a head stack assembly (FIG. 14) and a plan view of a magnetic recording apparatus (FIG. 15) wherein the magnetic recording head 1 is incorporated are depicted. The head stack assembly 250 is a member to which a first HGA 100-1 and second HGA 100-2 are mounted to arms 230-1, 230-2, respectively, on carriage 251. A HGA is mounted on each arm at intervals so as to be aligned in the perpendicular direction (orthogonal to magnetic medium 140). The coil portion (231 in FIG. 13) of the voice coil motor is mounted at the opposite side of each arm in carriage 251. The voice coil motor has a permanent magnet 263 arranged at an opposite position across the coil 231.

Figure 15:
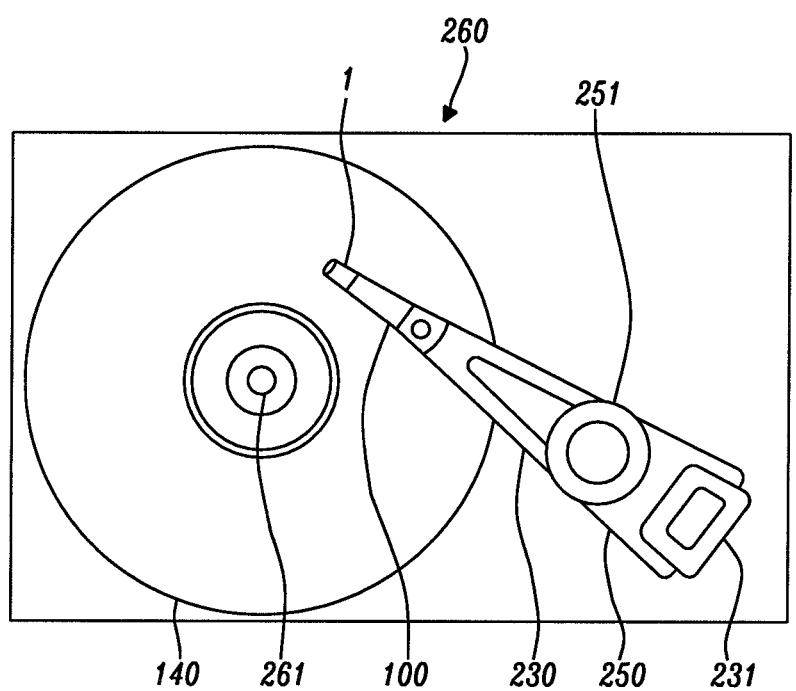
FIG. 15 is a plan view of a magnetic recording apparatus of the present disclosure.

With reference to FIG. 15, the head stack assembly 250 is incorporated in a magnetic recording apparatus 260. The magnetic recording apparatus has a plurality of magnetic media 140 mounted to spindle motor 261. For every magnetic recording medium, there are two magnetic recording heads arranged opposite one another across the magnetic recording medium. The head stack assembly and actuator except for the magnetic recording heads 1 correspond to a positioning device, and support the magnetic recording heads, and position the magnetic recording heads relative to the magnetic recording medium. The magnetic recording heads are moved in a cross-track of the magnetic recording medium by the actuator. The magnetic recording head records information into the magnetic recording media with a PMR writer element (not shown) and reproduces the information recorded in the magnetic recording media by a magnetoresistive (MR) sensor element (not shown).

Figure 3B:
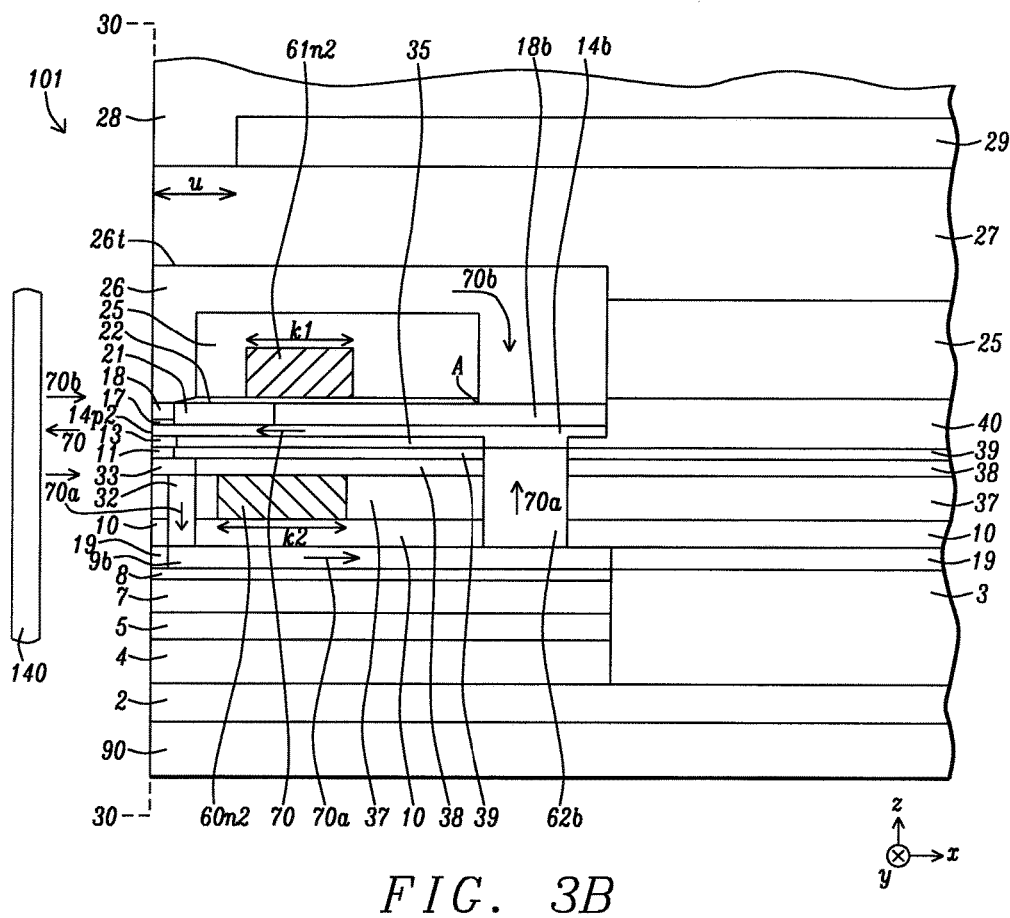

In FIG. 1, an ABS view is illustrated of a dual PMR writer structure according to one embodiment of the present disclosure where the first writer with first main pole tip 14p1 and track width TW1 is bisected by plane 41a-41a, and the second writer with second main pole tip 14p2 and track width TW2 is bisected by plane 41b-41b. Center plane 41c-41c is equidistant from planes 41a-41a and 41b-41b and is orthogonal to the ABS. Writer-to-writer spacing (WWS) is the cross-track distance between plane 41a-41a and plane 41b-41b. First and second main pole tips are shown with a trapezoidal shape but may have different shapes in other embodiments. Trailing sides 14t1, 14t2 of the first and second main pole tips, respectively, are formed on plane 42-42 that is orthogonal to the center plane. The first writer with main pole layer 14a having the first main pole tip is shown in a down-track cross-sectional view in FIG. 3A that is taken along plane 41a-41a. The second writer with main pole layer 14b having the second main pole tip is shown in FIG. 3B, which is a down-track cross-sectional view along plane 41b-41b.

Returning to FIG. 1, the main pole layers share a common trailing shield 18, and leading shield 11 that are bisected by center plane 41c-41c, and each main pole tip 14p1, 14p2 is surrounded by a gap layer that comprises leading gap 13, side gaps 15, and the write gap. In one embodiment, hot seed layer side 17s and write gap side 16s are coplanar and formed a distance m from plane 41a-41a in the first writer, and an equivalent distance m from plane 41b-41b in the second writer. First and second main pole tips have sides 14s1 and 14s2, respectively, and top surfaces 14t1 and 14t2, respectively, which are formed at plane 42-42 that also includes a top surface 12t of side shield layers 12. First and second main pole tips also comprise bottom surfaces 14b1, 14b2, respectively. Leading shield 11 has a top surface 11t at plane 43-43 which also includes a bottom surface of the leading gap. Plane 42-42 and plane 43-43 are parallel to each other and are orthogonal to the center plane and to the ABS. Side gaps adjoin inner sides 12s of the side shields.

In the exemplary embodiment, PP3 trailing shield 26 contacts a top surface of trailing shield layer 18 at the ABS. However, in other embodiments, the PP3 trailing shield may be recessed behind the ABS. Trailing shield layer 18 contacts HS layer side 17s and top surface 17t, and write gap side 16s, and adjoins side shields 12 at plane 42-42. The all wrap around (AWA) shield design has outer sides 67, 68, and features side shields that adjoin the leading shield at plane 43-43.

In all embodiments, WWS is preferably ≤15 microns so that RWO represented here as the distance between main pole tip 14p1 and center plane 41c-41c for writer 1, and the cross-track distance between main pole tip 14p2 and the center plane for writer 2 at the ABS is minimized. Smaller RWO is always preferred for less track misregistration and better ADC.

Referring to FIG. 2A and FIG. 2B, a scheme is provided for write current flow in a dual PMR writer according to an embodiment of the present disclosure when the main pole in the second writer is energized for a write process. The bucking coil and driving coil layout described herein was previously disclosed in related patent application HT17-030. At the driving coil level in FIG. 2A, there is a WWS distance between a top shield portion 18a (at plane 41a-41a) in the first writer and a top shield (TS) portion 18b (at plane 41b-41b) in the second writer. Similarly, at the bucking coil level in FIG. 2B, there is a WWS distance in the cross-track direction between a center of a back gap connection (BGC) 62a in a first writer and a center of BGC 62b for a second writer. WWS also represents the distance between the midpoints of a first main pole layer having a back portion formed on BGC 62a and a second main pole layer having a back portion formed on BGC 62b. The main pole layers are not pictured in FIGS. 2A-2B in order to clearly reveal the bucking coil and driving coil layouts.

When the write gate in the preamp of the HGA (shown in FIG. 4) is switched to "ON", write current $I_{W2}$ flows in a circuit (FIG. 2A) from W2+ pad 63b in a clockwise direction through driving coil (DC) second outer portion 61b to interconnect 65 and then in a counter-clockwise direction from the interconnect through bucking coil (BC) second outer portion 60b to W2− pad 64b (FIG. 2B) to energize the magnetic core comprised of TS shield portion 18b and the underlying second main pole layer (not shown) in the second writer. Alternatively, when writing with the first writer, write current $I_{W1}$ (not shown) flows in a circuit from W1+ pad 64a in a counter-clockwise direction (FIG. 2B) through BC first outer portion 60a to interconnect 65 and then in a clockwise direction through DC first outer portion 61a to W1− pad 63a (FIG. 2A) thereby energizing TS shield portion 18a and the underlying first main pole layer (not shown). The driving coil 61 has a front side 61f that is recessed from the ABS while bucking coil 60 also has a front side 60f that is recessed from the ABS.

Referring again to FIG. 2A, a preferred driving coil design according to an embodiment of the present disclosure is shown with a driving coil 61 having a substantially U shape with an inner side 61r on a DC first outer portion 61a, and facing plane 41a-41a, and inner side 61r on a DC second outer portion 61b, and facing plane 41b-41b. There is a backside 61e of DC center portion 61c, and backsides 61s1, 61s2 of DC outer portions 61a, 61b, respectively, that are a greater height from the ABS 30-30 than backside 61e. DC outer portions have a width s1, which is typically greater than width r1 of DC center portion 61c. Moreover, width r1 is preferably less than WWS. In some embodiments, DC first and second outer portions may not be symmetrical with respect to the center plane (not shown).

Another key feature is the driving coil arm 61n1 formed between driving coil center portion 61c and DC first outer portion 61a, and driving coil arm 61n2 formed between the DC center portion and DC second outer portion 61b. The DC center portion has a substantially rectangular shape aligned orthogonal to front side 61f. However, the DC center portion has a cross-track width that may be greater at end 61e to enable contact with an entire top surface of interconnect 65. Note that the cross-sectional area of each arm 61n1, 61n2 is substantially smaller than that of DC center portion 61c.

In FIG. 2B, a preferred bucking coil design according to an embodiment of the present disclosure is depicted with bucking coil 60 having a substantially U shape with an inner side 60r on a BC first outer portion 60a, and facing plane 41a-41a, and an inner side 60r on BC second outer portion 60b, and facing plane 41b-41b. There is a backside 60e of BC center portion 60c, and backsides 60s1, 60s2 of BC outer portions 60a, 60b, respectively, that are a greater height from the ABS 30-30 than backside 60e. BC outer portions have a width s2, which is typically greater than width r2 of BC center portion 60c. Width r2 of BC center portion 60c is preferably less than WWS.

Bucking coil arm 60n1 is formed between BC center portion 60c and BC first outer portion 60a while bucking coil arm 60n2 is formed between the BC center portion and BC second outer portion 60b. The BC center portion is substantially rectangular in shape and aligned orthogonal to front side 60f. However, the BC center portion has a cross-track width that may be greater at end 60e to enable contact with an entire bottom surface of interconnect 65. Preferably, the cross-sectional area of each arm 60n1, 60n2 is substantially less than that of the BC center portion. The driving coil arms and bucking coil arms may have a height k1, k2, respectively, that are shown in FIGS. 3A, 3B, respectively, where k2>k1 and each of k1 and k2 may be around 1 micron or less.

As described in related patent application HT17-031, the smaller cross-sectional area of the bucking coil and driving coil arms is advantageously used to cause higher direct current resistance (DCR) in the arms than in other portions of the bucking coil and driving coil. When the second writer is energized for writing, there is WG protrusion 81, 83 between center plane 41c-41c and plane 41b-41b because of enhanced heating from greater DCR in arms 61n2, 60n2, respectively. Accordingly, the maximum WG protrusion or close point is proximate to plane 41b-41b (and the location of the first main pole tip) to minimize magnetic spacing loss. WG protrusion 80, 82 centered at plane 41c-41c is caused by DCR in center portions 61c, 60c, respectively, and from the W_DFH heater (not shown) that is symmetrically disposed with respect to the center plane.

According to another embodiment of the present disclosure shown in FIG. 8, the dual PMR writer may have a separate bucking coil for each writer. In the exemplary embodiment, both bucking coils have a 1T configuration and are separated by center plane 41c-41c. Magnetic flux is generated in the first writer centered on plane 41a-41a by passing a current through a first circuit comprised of bucking coil 71a, and magnetic flux is generated in the second writer centered on plane 41b-41b by conducting a current through a second circuit comprised of bucking coil 71b. Bucking coil 71a has an inner portion 71i1 that contacts a bottom surface of interconnect 65a, a front portion 71f1 recessed from ABS 30-30, and a back portion 71n1 connected to W1+ writer pad 64a. Bucking coil 71b has an inner portion 71i2 that contacts a bottom surface of interconnect 65b, a front portion 71f2 recessed from the ABS, and a back portion 71n2 connected to W2+ writer pad 63b.

In FIG. 9, a driving coil design is depicted to complement the bucking coil scheme in FIG. 8, and features a separate driving coil each having a 1T configuration to energize each writer. Driving coil 72a for the first writer is centered at plane 41a-41a while driving coil 72b for the second writer is center at plane 41b-41b. Driving coil 72a has an inner portion 72i1 that contacts a top surface of interconnect 65a, a front portion 72f1 recessed from ABS 30-30, and a back portion 72n1. Driving coil 72b has inner portion 72i2 that contacts a top surface of interconnect 65b, front portion 72f2 recessed from the ABS, and back portion 72n2 that adjoins back portion 72n1 at center plane 41c-41c. Accordingly, the driving coils may share a common W− pad 68. Therefore, the first circuit described previously comprises bucking coil 71a, interconnect 65a, and driving coil 72a while the second circuit comprises bucking coil 71b, interconnect 65b, and driving coil 72b. In both circuits, current flows to the common W− pad.

Referring to FIG. 3A, a combined read/write head 101 according to one embodiment of the present disclosure is shown at plane 41a-41a in FIG. 1. The combined read/write head is formed on a substrate 1 that may be comprised of AlTiC (alumina+TiC). Those skilled in the art will recognize that layers 2-8 represent the read head portion of the recording device while overlying layers represent the first writer in the dual PMR structure described earlier. The substrate is typically part of a slider (not shown) formed in an array of sliders on a wafer. After the combined read/write head structure is completed, the wafer is sliced to form rows of sliders. Each row is typically lapped to afford an ABS before dicing to fabricate individual sliders for a HDD.

The present disclosure anticipates that one or more dynamic fly height (DFH) heater elements (described in a later section) may be formed in one or more insulation (dielectric) layers in the PMR writer structure to control the extent of thermal expansion (protrusion) along the ABS 30-30 toward a magnetic recording medium 140 during a read or write process. Read gap (RG) and write gap (WG) protrusion may be tuned by the placement of the one or more DFH heater elements, and by the choice of metal or alloy selected for the DFH heater elements since each DFH heater resistor material has a particular thermal and mechanical response to a given electrical input. When there is a single write DFH (W_DFH) heater in the writer, the W_DFH heater is typically positioned in one or more of the dielectric layers 38-40 behind top yoke 18a and BGC 62a while the DFH heater in the read head may be formed within dielectric layer 3, for example.

A first insulation layer 2 that may be comprised of alumina or another dielectric material is disposed on substrate 90. There is a second insulation layer 3 formed on the first insulation layer and behind the read head layers 4-8. Above layer 2 is the S1 shield 4 that is comprised of NiFe or CoFeNi or the like, and extends from the ABS toward a back end of the read head. A read gap 5 is formed between the S1 shield 4 and S2A shield 7. One or more sensors (6-1, 6-2 in FIG. 3C) are formed in the read gap 5 along the ABS 30-30 and typically include a plurality of layers (not shown)

in which two ferromagnetic layers are separated by a non-magnetic layer. The magnetic moment direction in one of the ferromagnetic layers is fixed and provides a reference direction, and the moment direction in the other ferromagnetic layer may be rotated by the magnetic field from the media.

Resistance across the read gap changes as the moment in the second ferromagnetic layer rotates. A "0" or "1" magnetic state can be defined depending on whether the two ferromagnetic layers are magnetically aligned in the same direction or in an antiparallel fashion. The non-magnetic layer in the sensors may be an insulator such as MgO in a tunneling magnetoresistive (TMR) sensor.

Magnetic layer 7, insulation layer 8, and return path (RTP) 9a are sequentially formed on the read gap 5. In some embodiments, the RTP serves as the S2B shield in the read head while magnetic layer 7 is the S2A shield. In other embodiments, magnetic layer 7 is a top read shield layer having a stack represented by S2A shield/insulation layer/S2B shield. S2A and S2B layers may be made of the same magnetic material as in the S1 shield 4. Although RTP 9a is recessed from the ABS and formed within insulation layer 19, the RTP may serve as a flux return pathway in the writer by magnetically connecting S2C 32 with back gap connection (BGC) 62a in leading loop pathway 70a that includes leading shield 11, leading shield connector (LSC) 33, shield section (S2C) 32, the RTP, and the BGC.

A bottom portion of BGC 62a contacts a top surface of RTP 9a, and a top BGC surface contacts a back portion of the bottom surface of main pole 14a. In the exemplary embodiment, there is a first insulation layer 10 formed on the RTP and adjoining the sides of S2C 32, and contacting the sides of a bottom portion of the BGC. A second insulation layer 37 is formed on the first insulation layer and has the bucking coil comprised of arm 60n1 formed within. Bucking coil 60 is completely displayed in the top-down view in FIG. 2D. The bucking coil is wound in series with an opposite polarity to that in the driving coil 61 in FIG. 2A to minimize direct coupling between the trailing shield 18 and driving coil.

Returning to FIG. 3A, a third insulation layer 38 is formed on insulation layer 37 behind LSC 33 and a fourth insulation layer 39 is on insulation layer 38 behind leading shield 11. Generally, insulation layers 10, 37-39 have a combined thickness essentially equal to that of BGC 62a. The LSC, S2C 32, BGC, and RTP 9a may be made of NiFe, CoFe, CoFeNi or the like with a saturation magnetization value of 10 kiloGauss (kG) to 16 kG.

There may be a bottom yoke 35 behind lead gap 13 and with a thickness essentially equal to that of the lead gap. Above the bottom yoke is the main pole layer 14a (with main pole tip 14p1 at the ABS 30-30) that may be comprised of NiFe, CoFe, CoFeNi, or CoFeN, and is preferably a 19 kG or 24 kG material. The first main pole 14a has a back portion that connects with a top surface of BGC 62a to complete the leading loop. Leading shield (LS) 11 is separated from the first main pole by lead gap 13. Flux 70 from the main pole enters magnetic medium 140 during a write process and returns in part as flux 70a though the leading loop comprised of LS 11, LSC 33, S2C 32, RTP 9a, and the BGC.

A first trailing shield (TS) layer 17 also known as the hot seed layer has a bottom surface formed on a write gap (not shown) at the ABS and extends a throat height distance away from the ABS 30-30 to an ABS facing (front) side of non-magnetic layer 21. A second TS layer 18 also extends from the ABS to layer 21, and like the first TS layer, may be made of CoFeN, CoFeNi, NiFe, or CoFe and is part of the trailing loop. The trailing loop for flux 70b to return to first main pole 14a further includes a third trailing shield portion named PP3 trailing shield 26 that arches over the driving coil including arm 61n1 to connect with a back portion 18a of the second TS layer above the first main pole back portion. TS layer 18/18a and the PP3 trailing shield are typically made of materials with a 16 kG to 19 kG magnetic saturation value. TS layer 18a is sometimes referred to as a top yoke, and has a backside at point A that touches the inner corner of PP3 26. Insulation layer 22 is formed on a portion of the non-magnetic layer 21 and top yoke.

Although PP3 trailing shield 26 arches over driving coil arm 60n1 with a dome shape, the PP3 trailing shield may have a substantially flat top surface in other designs. An insulation layer 25 is formed on the insulation layer 22 and fills the openings between the driving coil 61 (shown in FIG. 2B) and the PP3 trailing shield. A protection layer 27 covers the PP3 trailing shield and is made of an insulating material such as alumina. Above the protection layer and recessed a certain distance from the ABS 30-30 is an optional cover layer 29 that is preferably comprised of a low CTE material such as SiC that serves to reduce the WG protrusion rate. SiC cover layer is recessed a distance u to avoid introducing a material at the ABS with different mechanical/etch resistance properties than adjacent layers that could adversely affect back end lapping and ion beam etching processes. Overcoat layer 28 is formed as the uppermost layer in the writer.

The dual flux return pathway in the first writer shown in FIG. 3A (and second writer in FIG. 3B) is employed to reduce STE.

Referring to FIG. 3B, the second writer in the combined read/write head 101 of the present disclosure is shown with a down-track cross-sectional view at plane 41b-41b in FIG. 1. All layers are retained from FIG. 3A except the first main pole 14a is replaced by second main pole 14b, bucking coil arm 60n2 is formed within insulation layer 37 proximate to the ABS 30-30, and driving coil arm 61n2 is formed within insulation layer 25. The leading loop is comprised of leading shield 11, LSC 33, S2C 32, RTP 9b, and BGC 62b. The trailing loop includes first TS layer 17, second TS layer 18, PP3 trailing shield 26, and a back portion 18b of the second TS layer above a back portion of the second main pole. It should be understood that the shapes for the BGCs, trailing shield structure, and coils are not limited to those depicted in FIG. 3A and FIG. 3B. In other words, the shapes for the magnetic core including main poles and top and bottom yokes, driving coil, and bucking coil may be altered to optimize performance for PMR writer requirements that vary from one HDD product to the next.

Figure 3C:
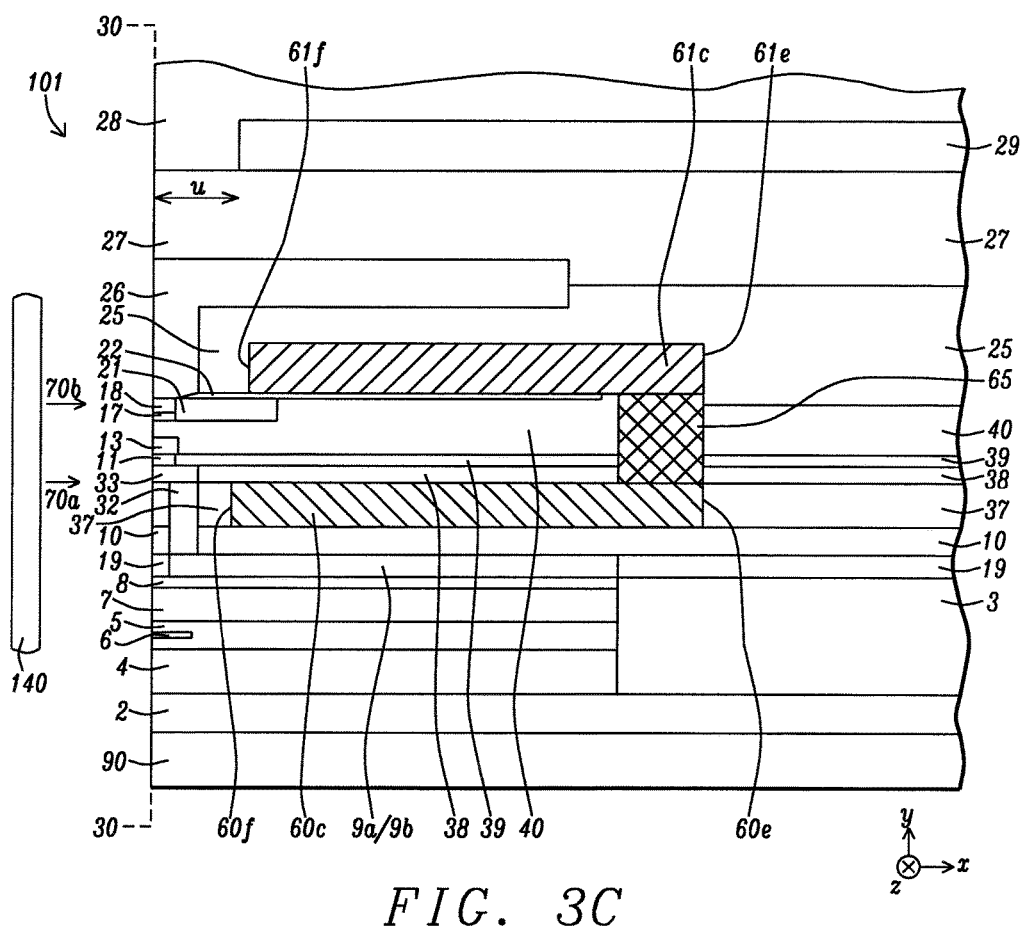
FIG. 3C is a down-track cross-sectional view along a center plane midway between the first and second writers in FIG. 1.

Referring to FIG. 3C, a down-track cross-sectional view along center plane 41c-41c in FIG. 1 is illustrated according to an embodiment of the present disclosure. Note that the trailing shield structure including PP3 trailing shield 26 is present along with leading shield structure including LSC 33, S2C 32, and RTP 9a/9b. However, TS layer 18a/18b and the BGC are absent at the center plane where the first writer adjoins the second writer. DC center portion 61c is shown with front side 61f and backend 61e, and BC center portion 60c is pictured with front side 60f and backend 60e. Interconnect 65 adjoins a bottom surface of DC center portion 61c proximate to backend 61e, and contacts a top surface of BC center portion 60c proximate to backend 60e. A W_DFH heater (not shown) may be placed in one or more of the dielectric layers 38-40 proximate to a backside of interconnect 65. There may also be a second DFH heater (not shown) in the read head portion such as in dielectric layer 3, for example.

It should be understood that other write head designs may be employed other than those shown in FIGS. 3A-3C without limiting the advantages of the present disclosure. Alternative dual PMR writer designs are disclosed in related patent application HT17-033.

Figure 4:
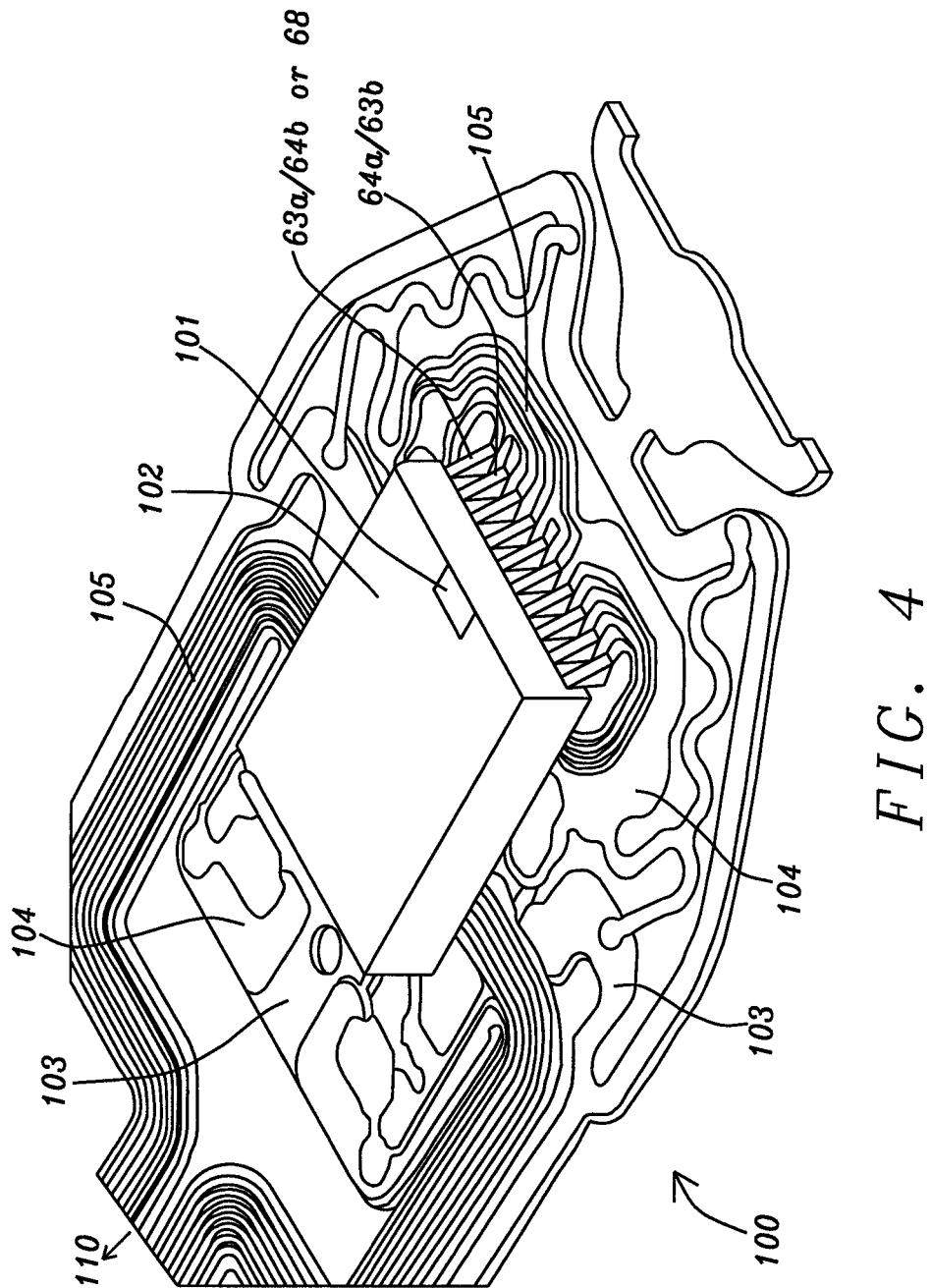
FIG. 4 is an oblique view of a slider on which a combined read/write head structure is mounted, and having adjoining pads and trace lines (wiring) formed on a suspension according to an embodiment of the present disclosure.

Referring to FIG. 4, HGA 100 is depicted and features suspension 103, an overlying dielectric layer 104, and slider 102 formed thereon. The combined read/write head 101 comprised of the dual PMR writer of the present disclosure adjoins a top side of the slider facing away from the suspension. The suspension is supported by an actuator arm (not shown) that is driven by an actuation motor to sweep the suspension and slider across the surface of a recording disk shown in FIG. 7. Pads including W1+ pad 64a, W2+ pad 63b and a common W− pad 68 are attached to slider side 102s according to the embodiment described with respect to FIGS. 8-9. In some embodiments such as the coil layout in FIGS. 2A-2B, the common W− pad may be replaced by two pads, W1− pad 63a and W2− pad 64b. W1− pad 63a, W1+ pad 64a, W2+ pad 63b and W2− pad 64b are attached to slider side 102s. Trace lines 105 connect the plurality of pads to preamp 110. Connections between the pads and the driving/bucking coils in the combined read/write head are within the slider and not visible from this view.

Figure 5:
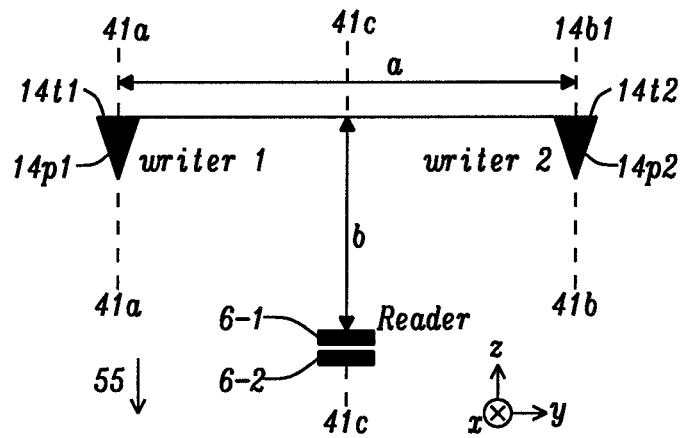
FIG. 5 is a schematic drawing of two writers with dual readers at a center plane midway between the two writers, and at 0 degree skew.

In FIG. 5, a schematic drawing is provided for a dual PMR writer at 0 skew where plane 41a-41a that bisects first main pole tip 14p1 and trailing side 14t1 in the first writer (writer 1) is separated by cross-track distance a (WWS) from plane 41b-41b that bisects second main pole tip 14p2 and trailing side 14t2 in the second writer (writer 2). In the exemplary embodiment, the disk motion 55 is counterclockwise or downward. Although a dual reader is depicted with reader 6-1 formed above reader 6-2 at the center plane 41c-41c, there may be a single reader in an alternative embodiment. There is a down-track distance b between plane 42-42 and a top surface of reader 6-1. In this example, RWO=−a/2 for writer 1 and RWO=a/2 for writer 2.

Figure 6:
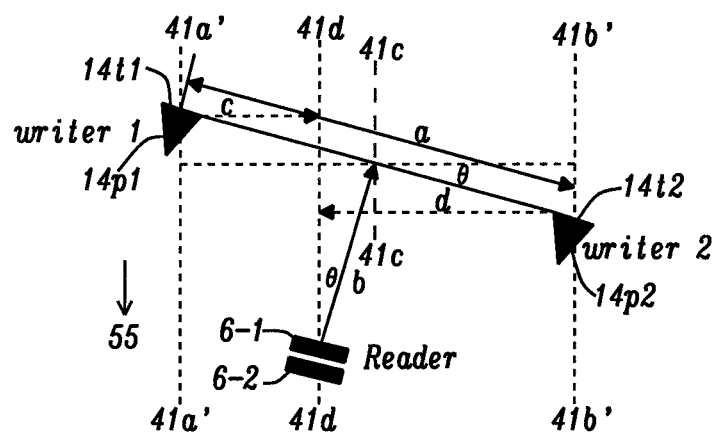
FIG. 6 is a schematic drawing of two writers with dual readers at a center plane midway between the two writers, and at θ skew.

FIG. 6 depicts the dual PMR writer at a θ skew during OD writing where θ is typically a negative degree angle. RWO is shown as c for writer 1 and is derived from the equation $c=\cos(\theta)\times[a/2+b\times\tan(\theta)]$ while RWO for writer 2 is shown as d and derived from the equation $d=\cos(O)\times[a/2-b\times\tan(\theta)]$. Table 1 below lists the results for c and d at 0° skew and at −15° skew.

where both writers are UP facing (UP head configuration). In the mirror image case where both writers are down facing (DN head configuration), writer 1 now has RWO=d while writer 2 has RWO=c. Thus, the head orientation in the HGA enables the writer with the better performance at OD skew to also have the smaller RWO (c value).

In actual HDD applications, smaller RWO (c and d) are always preferred for less track misregistration (TMR) and better ADC. Since the outer disk (OD) area is larger than the inner disk (ID) area, and outer disk linear velocity is higher with more TMR concern, smaller RWO at OD skew can offer better area density capability than smaller RWO at ID skew if there is a choice. FIG. 6 depicts the actual orientation of an UP head at OD skew. Therefore, in an embodiment where writer 1 is found to have better performance during DP testing, writer 1 is preferably assigned to an UP head rather than a DN head when paired with the suspension in a HGA to enable smaller RWO at OD skew. Because DN heads are a mirror image of UP heads, writer 2 preferably is assigned a DN head when paired with the suspension in a HGA to provide smaller RWO at OD skew in an embodiment where writer 2 has better performance during DP testing.

Referring to FIG. 7, recording disk 75 is shown with a center position 75c midway between edges 75e, and OD and ID regions are identified. Typically, both of top surface 75t and bottom surface 75b are coated with magnetic media (not shown) that are writeable. Thus, slider 80d having a DN head orientation for writer 1 and writer 2, and paired with a down facing (DN) suspension may be used to write top surface 75t. Moreover, a second slider 80u having an UP head orientation for writer 1 and writer 2, and paired with an up facing (UP) suspension may be employed to write bottom surface 75b. As mentioned previously, slider 80d is configured with writer 2 (better writer for OD skew) at a smaller distance from center position 75c than writer 1, and slider 80u is configured with writer 1 (better writer for OD skew) at a smaller distance from the center position than writer 2. Only the pads and writers are shown to simplify the drawing. A more detailed view of the relationship of pads, slider, and suspension is illustrated in FIG. 4.

The pad configuration in FIG. 7 relates to an embodiment where there are separate bucking coils (connected to W2+ pad 63b and W1+ pad 64a) and separate driving coils

TABLE 1

Estimation of reader-writer offset RWO = "c" for writer 1 and RWO = "d" at 0° and −15° skew as a function of writer-writer spacing "a" and reader-writer spacing "b"

|  | Skew = 0 degrees | | | | Skew = −15 degrees | | | |
| --- | --- | --- | --- | --- | --- | --- | --- | --- |
| a (um) | 10 | 5 | 10 | 5 | 10 | 5 | 10 | 5 |
| b (um) | 5 | 5 | 4 | 4 | 5 | 5 | 4 | 4 |
| c (um) | −5.0 | −2.5 | −5.0 | −2.5 | −3.5 | −1.1 | −3.8 | −1.4 |
| d (um) | 5.0 | 2.5 | 5.0 | 2.5 | 6.1 | 3.7 | 5.9 | 3.5 |

Table 1 indicates that when WWS (a) is decreased at the same b value, then both c and d are reduced for both skew angles. However, when b is decreased while holding a constant, c becomes greater and d is reduced. At −15° skew, the absolute value of c is less than the corresponding value at 0° skew, but the absolute value of d is greater than the corresponding value at 0° skew. Thus, reducing b while maintaining a, or shrinking a while holding b constant are options for minimizing the growth in d for writer 2 at negative skew angles. The results in Table 1 where writer 1 has RWO=c and writer 2 has RWO=d relates to the case (connected to common W− pad 68) for the two writers as explained previously, and where there are two readers, and two W_DFH heaters as described in a later section. The first reader has functionality controlled through pad R1− 67a, and pad R1+ 67b while the second reader is controlled through pads R2− 67c and R2+ 67d. The first W_DFH heater is connected to pad Hw1 69a, second W_DFH heater is connected to Hw2 pad 69c, and both are connected to H/G (ground) pad 69b. Read gap (RG) protrusion is controlled by Hr heater pad 69d. HDI sensors (not shown) are connected to S+ pad 66b and S− pad 66a.

Figure 10:
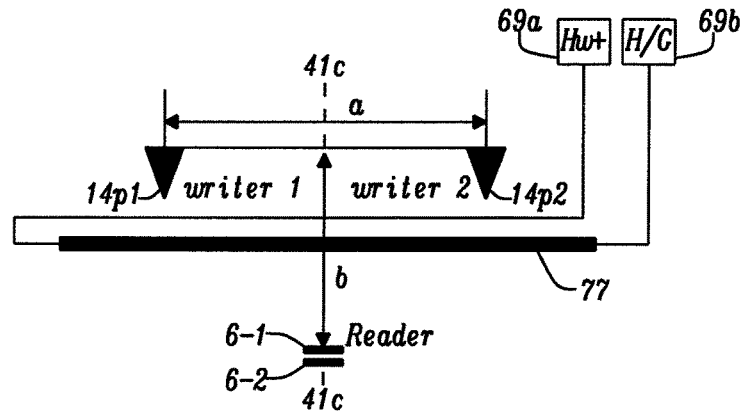
FIG. 10 is a schematic drawing of a single writer dynamic fly height (W_DFH) heater design in a dual PMR writer according to an embodiment of the present disclosure.

The present disclosure anticipates that the dual PMR writer disclosed herein may comprise one or two W_DFH heaters. According to a first embodiment depicted in FIG. 10, a single W_DFH heater 77 is symmetrically disposed about center plane 41c-41c and may have a cross-track width greater than a. Thus, WG protrusion (not shown) caused by the heater is symmetrical with respect to the center plane. In other words, WG protrusion resulting from the W_DFH heater activation is substantially the same at the cross-track position (plane 41a-41a) for main pole tip 14p1 and at the cross-track position (plane 41b-41b) for main pole tip 14p2. There is a first heater pad Hw+ 69a to provide a current for heater activation, and a heater ground pad H/G 69b.

Figure 11:
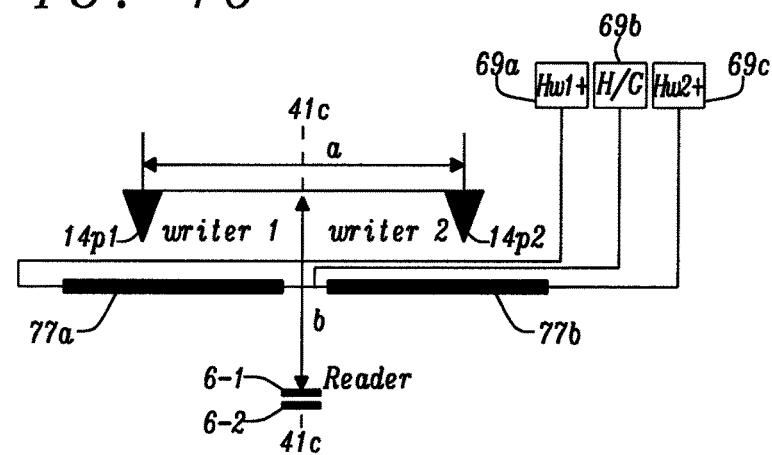
FIG. 11 is a schematic drawing of a dual writer (W_DFH) heater design where one W_DFH heater is paired with a first writer, and a second W_DFH heater is paired with a second writer according to an embodiment of the present disclosure.

According to a second embodiment shown in FIG. 11, two W_DFH heaters are in the dual PMR writer structure to provide improved fly height control of the better writer at OD skew to maximize writer performance. There is a first W_DFH heater 77a formed within writer 1 on the same side of center plane 41c-41c as main pole tip 14p1. Therefore, when writer 1 is used for a write process, only the first W_DFH heater is activated to ensure the close point is proximate to plane 41a-41a and main pole tip 14p1 to avoid magnetic spacing loss defined previously in related patent application HT17-031. Likewise, when writer 2 is used for writing, only the second W_DFH heater 77b is employed to ensure the close point is proximate to plane 41b-41b and main pole tip 14p2. The second W_DFH heater is formed within writer 2 on the same side of the center plane as main pole tip 14t2. Heater pad Hw1+ 69a supplies current to the first W_DFH heater, and a second heater pad Hw2+ 69c supplies current to the second W_DFH heater. Moreover, there is a common ground heater pad H/G 69b.

Figure 12:
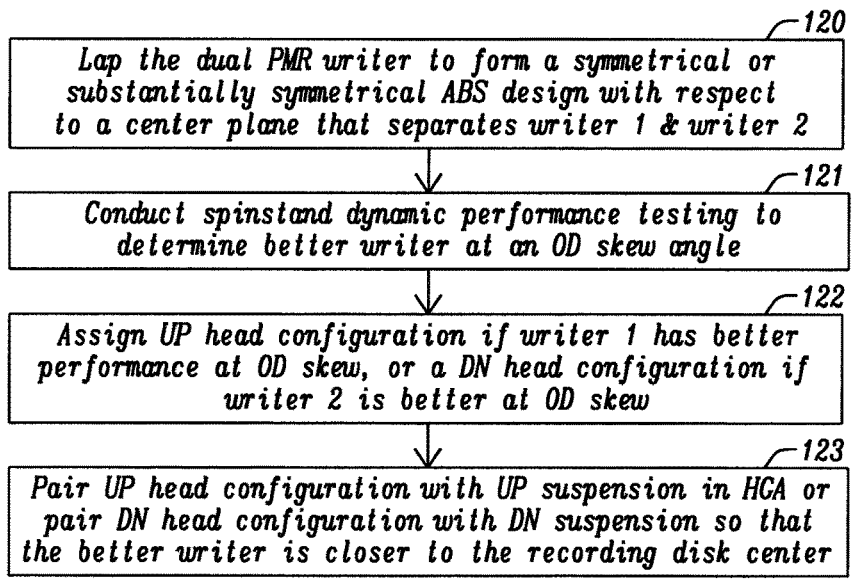
FIG. 12 is a flow diagram showing a process of lapping a dual writer to form an ABS, determining the better writer and assigning an UP or DN head position, and then integrating into a HGA according to an embodiment of the present disclosure.

The present disclosure encompasses a process flow for assigning head configuration and pairing with a suspension summarized in FIG. 12. In step 120, the dual PMR writer structure is lapped to generate an ABS that is preferably symmetrical, or at least substantially symmetrical with respect to a center plane (41c-41c in FIG. 1) that separates writer 1 from writer 2. Thereafter, DP backend testing in step 121 is employed to determine which of writer 1 or writer 2 has better performance in terms of better BER and higher ADC at an OD skew angle. Step 122 comprises assigning an up facing (UP) head configuration if writer 1 has better performance, or assigning a DN head configuration if writer 2 has better performance. Step 122 requires a symmetrical or substantially symmetrical ABS design to allow flexibility in assigning either an UP head or DN head. In other words, writer 1 and writer 2 should be substantially mirror images of one another. In step 123, the UP head configuration is paired with an UP suspension or the DN head configuration is paired with a DN suspension during integration in the HGA. Accordingly, the better writer will be a smaller distance from the center of a recording disk during a write process.

When track width (TW) shrinks below 100 nm for a single writer, it is often difficult to achieve symmetry between writer 1 and writer 2, and there will be variations in performance from one writer to the next for a given target TW. However, we have found that mean ADC is improved and the sigma is tightened when the better writer for OD skew in the dual PMR writer of the present disclosure is integrated in a HGA as described herein.

A method of fabricating a dual PMR writer structure is disclosed in related patent application HT17-030. The method of selecting the better writer in a dual PMR writer scheme is provided in detail in related patent application HT17-028. It should be understood that the process is independent of skew angle or region (ID or OD).

While the present disclosure has been particularly shown and described with reference to, the preferred embodiment thereof, it will be understood by those skilled in the art that various changes in form and details may be made without departing from the spirit and scope of this disclosure.

We claim:

1. A head gimbal assembly (HGA), comprising:
   (a) a slider that is formed on a suspension; and
   (b) a dual perpendicular magnetic recording (PMR) writer structure that is formed on the slider, comprising:
      (1) a first main pole layer in a first writer on the slider, and having a first main pole tip with a leading side and trailing side at an air bearing surface (ABS), and bisected by a first plane that is at a first cross-track position and orthogonal to the ABS;
      (2) a second main pole layer in a second writer on the slider and having a second main pole tip with a leading side and trailing side at the ABS, and bisected by a second plane that is orthogonal to the ABS, the second plane is at a second cross-track position and a first cross-track width from the first plane;
      (3) at least one bucking coil (BC) that is recessed from the ABS and formed below one or both of the first and second main pole layers;
      (4) at least one driving coil (DC) that is recessed from the ABS, and formed above one or both of the first and second main pole layers; and
      (5) a first interconnect formed between the at least one BC and the at least one DC, and configured such that when a write current is passed through the at least one BC, first interconnect, and the at least one DC, magnetic flux is generated in the first main pole layer or in the second main pole layer.

2. The HGA of claim 1 wherein the dual PMR writer structure has an up facing (UP) head configuration and the suspension is an UP suspension when the first writer has better writing performance than the second writer such that the first writer is a smaller distance from a center of a recording disk during a write process, and is selected as a functional writer in the HGA while the second writer is disabled.

3. The HGA of claim 1 wherein the dual PMR writer structure has a down facing (DN) head configuration and the suspension is a DN suspension when the second writer has better writing performance than the first writer such that the second writer is a smaller distance from a center of a recording disk during a write process, and is selected as a functional writer in the HGA while the first writer is disabled.

4. The HGA of claim 1 wherein the at least one BC is symmetrically disposed about a center plane separating the first writer and second writer, and the at least one BC has a substantially U shape wherein a BC center portion with a substantially rectangular shape extends from a BC front side to a backend that contacts a bottom surface of the first interconnect, a BC first outer portion connects to the BC center portion with a first arm proximate to the BC front side and first plane, and a BC second outer portion connects to the BC center portion with a second arm proximate to the BC front side and second plane.

5. The HGA of claim 4 wherein the at least one DC is symmetrically disposed about the center plane and has a substantially U shape wherein a DC center portion with a substantially rectangular shape extends from a DC front side to a backend that contacts a top surface of the first interconnect, a DC first outer portion connects to the DC center portion with a third arm proximate to the DC front side and first plane, and a DC second outer portion connects to the DC center portion with a fourth arm proximate to the DC front side and second plane.

6. The HGA of claim 1 wherein the at least one BC is formed below the first main pole layer in the first writer, and the dual PMR writer further comprises a second BC formed below the second main pole layer in the second writer, and the second writer further comprises a second interconnect formed on the second BC, and wherein the first BC and second BC are separated by a center plane between the first and second writers, and wherein that the first BC is connected to a W1+ pad and the second BC is connected to a W2+ pad.

7. The HGA of claim 6 wherein the at least one DC is formed above the first main pole layer in the first writer, and the dual PMR writer further comprises a second DC formed above the second main pole layer in the second writer, and wherein the second DC contacts a top surface of the second interconnect, and wherein the first DC and second DC each have a back portion that contact each other at the center plane and are connected to a common W− pad.

8. The HGA of claim 1 wherein the dual PMR writer structure is further comprised of a dynamic fly height (DFH) heater that is symmetrically disposed around the center plane and when activated provides a substantially equal amount of write gap (WG) protrusion at the first and second main pole tips at the ABS.

9. The HGA of claim 1 wherein the dual PMR writer structure is further comprised of two DFH heaters wherein a first DFH heater is formed in the first writer, and on a first side of a center plane that separates the first writer from the second writer, and a second DFH heater is formed in the second writer and on a second side of the center plane.

10. The HGA of claim 1 wherein the first cross-track width is less than or equal to 15 microns.

11. The HGA of claim 1 wherein a first reader is formed in the dual PMR writer structure at a center plane that separates the first writer and second writer, and is a first down-track distance below a plane comprising the trailing sides of the first and second main pole tips.

12. The HGA of claim 11 further comprised of a second reader formed below the first reader at the center plane.

13. The HGA of claim 9 wherein the first DFH heater is activated by a first heater pad, the second DFH heater is activated by a second heater pad, and there is a common ground pad for the two DFH heaters.

14. The HGA of claim 1 wherein the suspension further comprises a load beam with one end connected to a flexure, and a base plate connected to the other end of the load beam.

15. A magnetic recording apparatus, comprising:
(a) the HGA according to claim 1;
(b) a magnetic recording medium positioned opposite to the slider;
(c) a spindle motor that rotates and drives the magnetic recording medium; and
(d) a device that supports the slider, and that positions the slider relative to the magnetic recording medium.

16. A method of assigning head configuration in a dual perpendicular magnetic recording (PMR) writer; comprising:
(a) providing a first PMR writer on a slider, wherein the first PMR writer has a trailing side on a first main pole tip at an air bearing surface (ABS) and is bisected by a first plane that is orthogonal to the ABS and at a first cross-track position from a center plane that is parallel to the first plane;
(b) providing a second PMR writer on the slider and having a trailing side on a second main pole tip which is bisected by a second plane that is at a second cross-track position from the center plane and is on an opposite side of the center plane with respect to the first plane;
(c) determining whether the first writer or second writer has better write performance when writing at outer diameter (OD) skew on a magnetic recording medium on a recording disk;
(d) assigning an up facing (UP) head configuration to the dual PMR writer when the first writer has better performance, or assigning a down facing (DN) head configuration to the dual PMR writer when the second writer has better performance; and
(e) integrating the dual PMR writer in a head gimbal assembly (HGA) by pairing the UP head configuration with an UP suspension when the first writer has better performance, or by pairing the DN head configuration with a DN suspension when the second writer has better performance such that the first or second writer with better performance is a smaller distance from a center of the recording disk than the other of the first writer and second writer during a write process.

17. The method of claim 16 wherein determining whether the first writer or second writer has better performance is accomplished with dynamic performance spin stand testing.

18. The method of claim 16 wherein the dual PMR writer further comprises a driving coil (DC) with a substantially U shape and having a DC center portion with a substantially rectangular shape that extends from a DC front side to a backend that contacts an interconnect, a DC first outer portion that is connected to the DC center portion with a first arm proximate to the DC front side and first plane, and a DC second outer portion that is connected to the DC center portion with a second arm proximate to the DC front side and second plane.

19. The method of claim 18 wherein the dual PMR writer further comprises a bucking coil (BC) with a substantially U shape and having a BC center portion with a substantially rectangular shape that extends from a BC front side to a backend that contacts the interconnect, a BC first outer portion that is connected to the BC center portion with a third arm proximate to the BC front side and first plane, and a BC second outer portion that is connected to the BC center portion with a fourth arm proximate to the BC front side and second plane.

20. The method of claim 16 wherein the first writer further comprises a first bucking coil (BC) below the first main pole layer, contacting a bottom surface of a first interconnect, and connected to a W1+ pad, and further comprises a first driving coil (DC) above the first main pole layer, contacting a top surface of the first interconnect, and connected to a common W− pad such that when a write current passes through the first BC, first interconnect, and first DC, magnetic flux is generated in the first main pole layer to perform a write process.

21. The method of claim 20 wherein the second writer further comprises a second BC below the second main pole layer, contacting a bottom surface of a second interconnect, and connected to a W2+ pad, and further comprises a second DC above the second main pole layer, contacting a top surface of the second interconnect, and connected to the common W− pad such that when a write current passes through the second BC, second interconnect, and second DC, magnetic flux is generated in the second main pole layer to perform a write process.

22. The method of claim 16 wherein dual PMR writer further comprises a dynamic fly height (DFH) heater that is symmetrically disposed around the center plane and when activated provides substantially the same amount of write gap (WG) protrusion at the first and second main pole tips at the ABS.

23. The method of claim 16 wherein the dual PMR writer is further comprised of two DFH heaters wherein a first DFH heater is formed in the first writer, and on a first side of the center plane, and a second DFH heater is formed in the second writer and on a second side of the center plane so that only the first DFH heater is activated when the first writer is used for a write process, and only the second DFH heater is activated when the second writer is used for a write process.

* * * * *